US011330225B2

(12) United States Patent
Park

(10) Patent No.: US 11,330,225 B2
(45) Date of Patent: May 10, 2022

(54) DISPLAY APPARATUS

(71) Applicant: Samsung Electronics Co., Ltd., Suwon-si (KR)

(72) Inventor: Yong Hwan Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/760,561

(22) PCT Filed: Sep. 3, 2018

(86) PCT No.: PCT/KR2018/010223
§ 371 (c)(1),
(2) Date: Apr. 30, 2020

(87) PCT Pub. No.: WO2019/088436
PCT Pub. Date: May 9, 2019

(65) Prior Publication Data
US 2020/0344440 A1    Oct. 29, 2020

(30) Foreign Application Priority Data
Oct. 31, 2017    (KR) .................. 10-2017-0143623

(51) Int. Cl.
*H04N 5/655*    (2006.01)
(52) U.S. Cl.
CPC .................. *H04N 5/655* (2013.01)
(58) Field of Classification Search
CPC .......... H04N 5/655; H04N 5/64; H04N 5/645; H04N 5/642; G06F 1/1601; G06F 1/16;
(Continued)

(56) References Cited

U.S. PATENT DOCUMENTS

2014/0338144 A1\*  11/2014  An .................. B60S 1/3801
                                                   15/250.32
2016/0095233 A1\*  3/2016   Kusumi ............ H05K 5/0017
                                                   361/756
(Continued)

FOREIGN PATENT DOCUMENTS

KR    10-2005-0091771 A    9/2005
KR    10-2009-0030400 A    3/2009
(Continued)

OTHER PUBLICATIONS

PCT Form PCT/ISA210; International Search Report dated Sep. 3, 2018 in corresponding PCT Application No. PCT/KR2018/010223.

*Primary Examiner* — Thai Q Tran
*Assistant Examiner* — Nienru Yang
(74) *Attorney, Agent, or Firm* — Staas & Halsey LLP

(57) ABSTRACT

Provided is a display apparatus with improved assembly stability and clearance stability. The display apparatus includes a display unit and a stand connected to the display unit and supporting the display unit, wherein the stand includes a first stand member including a coupling protrusion, and a second stand member including a coupling groove in a shape corresponding to a shape of the coupling protrusion such that the coupling protrusion is inserted into the coupling groove, and coupled to the first stand member to form the stand, wherein the coupling protrusion is obliquely formed in a downward direction such that the first stand member and the second stand member coupled to each other in a diagonal direction.

15 Claims, 7 Drawing Sheets

(58) Field of Classification Search
CPC .. H05K 7/00; H05K 7/14; H05K 5/00; H05K 5/02; F16M 11/22; F16M 11/04; F16M 2200/08; G09F 7/18
USPC .......................................................... 348/836
See application file for complete search history.

(56) References Cited

U.S. PATENT DOCUMENTS

2017/0152074 A1\* 6/2017 Park ........................ B65D 43/02
2017/0265321 A1\* 9/2017 Park ........................ H05K 5/0017

FOREIGN PATENT DOCUMENTS

| KR | 10-2014-0048012 A | 4/2014 |
| KR | 10-2014-0099057 A | 8/2014 |
| KR | 10-2017-0105919 A | 9/2017 |

\* cited by examiner

DISPLAY APPARATUS

CROSS-REFERENCE TO RELATED APPLICATIONS

This application is a U.S. National Stage Application which claims the benefit under 35 U.S.C. § 371 of International Patent Application No. PCT/KR2018/010223 filed on Sep. 3, 2018, which claims foreign priority benefit under 35 U.S.C. § 119 of Korean Patent Application No. 10-2017-0143623 filed on Oct. 31, 2017, in the Korean Intellectual Property Office, the contents of both of which are incorporated herein by reference

TECHNICAL FIELD

The disclosure relates to a display apparatus including a stand provided so that a display unit is used while standing upright on a horizontal plane.

BACKGROUND ART

In general, a display apparatus refers to an apparatus for displaying an image, and includes a monitor, a television, and the like.

Such a display apparatus includes a display unit on which a screen is displayed and a stand provided so that the display unit is installed while standing upright on a horizontal plane.

The stand is formed to have a sufficient width in the front-rear direction as well as the left-right direction in order to prevent the display unit from falling.

In general, the left-right width of the stand is formed smaller than the left-right width of the display unit, whereas the front-rear width of the stand needs to be formed inevitably greatly larger than the front-rear width of the display unit, and thus the front-rear width of a package box needs to be formed greatly large to correspond to the front-rear width of the stand.

DISCLOSURE

Technical Problem

Therefore, it is an object of the disclosure to provide provides a display apparatus including a stand that may allow the size of a packaging box to be reduced.

It is another object of the disclosure to provide a display apparatus that may allow a stand and a display unit to be easily coupled to each other.

It is another object of the disclosure to provide a display apparatus including a stand having high dimensional stability and small clearance so that the assembly performance is improved.

It is another object of the disclosure to provide a display apparatus including a stand with improved productivity.

Technical Solution

According to an aspect of the disclosure, there is provided a display apparatus including: a display unit; and a stand connected to the display unit and supporting the display unit, wherein the stand includes: a first stand member including a coupling protrusion; and a second stand member including a coupling groove having a shape corresponding to a shape of the coupling protrusion such that the coupling protrusion is inserted into the coupling groove, and coupled to the first stand member to form the stand, wherein the coupling protrusion is obliquely formed in a downward direction such that the first stand member and the second stand member are coupled to each other in a diagonal direction.

The first stand member may include a first coupling surface on which the coupling protrusion protrudes, and a lowest point of the coupling protrusion may be located below a contact point between the coupling protrusion and the first coupling surface.

The second stand member may include a second coupling surface on which the coupling groove is recessed, and a lowest point of the coupling groove may be located below a contact point between the coupling groove and the second coupling surface.

When the first stand member is coupled to the second stand member, the first coupling surface may make surface contact with the second coupling surface.

The display apparatus may further include a coupling plate that couples the display unit to the stand such that the display unit is connected to the stand.

The coupling plate may be coupled to the first stand member and the second stand member to prevent the first stand member from being separated from the second stand member.

The first stand member may include: a first leg portion supported on a horizontal plane; a first coupling portion coupled to the first leg portion and including the coupling protrusion; and a first housing accommodating the first leg portion and the first coupling portion.

The second stand member may include: a second leg portion supported on the horizontal plane; a second coupling portion coupled to the second leg portion and including the coupling groove; and a second housing accommodating the second leg portion and the second coupling portion.

The first coupling portion and the second coupling portion may be formed by extruding metal.

When the coupling protrusion is inserted into the coupling groove in a first direction, the second housing may prevent the coupling protrusion from moving in a second direction perpendicular to the first direction.

According to another aspect of the disclosure, there is provided a display apparatus including: a display unit; a stand connected to the display unit and supporting the display unit; and a coupling plate that couples the display unit to the stand such that the display unit is connected to the stand, wherein the stand includes: a first stand member including a coupling protrusion obliquely formed in a downward direction; and a second stand member including a coupling groove having a shape corresponding to a shape of the coupling protrusion such that the coupling protrusion is inserted into the coupling groove, and coupled to the first stand member to form the stand.

The coupling plate may be coupled to the first stand member and the second stand member to prevent the first stand member from being separated from the second stand member.

The first stand member may include a first coupling surface on which the coupling protrusion protrudes, and a lowest point of the coupling protrusion may be located below a contact point between the coupling protrusion and the first coupling surface.

The second stand member may include a second coupling surface on which the coupling groove is recessed, wherein a lowest point of the coupling groove may be located below a contact point between the coupling groove and the second coupling surface.

When the first stand member is coupled to the second stand member, the first coupling surface may make surface contact with the second coupling surface.

Advantageous Effects

As is apparent from the above, the display apparatus according to the disclosure is packaged in a state in which the stand separated into the first stand member and the second stand member in the front-rear direction, so that the size of the packaging box for packaging the display apparatus can be significantly reduced.

The display apparatus including the stand according to the disclosure is provided with improved dimensional stability and small clearance so that assembly stability can be improved.

The first stand member and the second stand member may be easily combined into the stand, and the combined stand may stably stand by itself, so that the display unit can be easily coupled to the stand.

BEST MODES OF THE DISCLOSURE

Modes of the Disclosure

Figure 1:
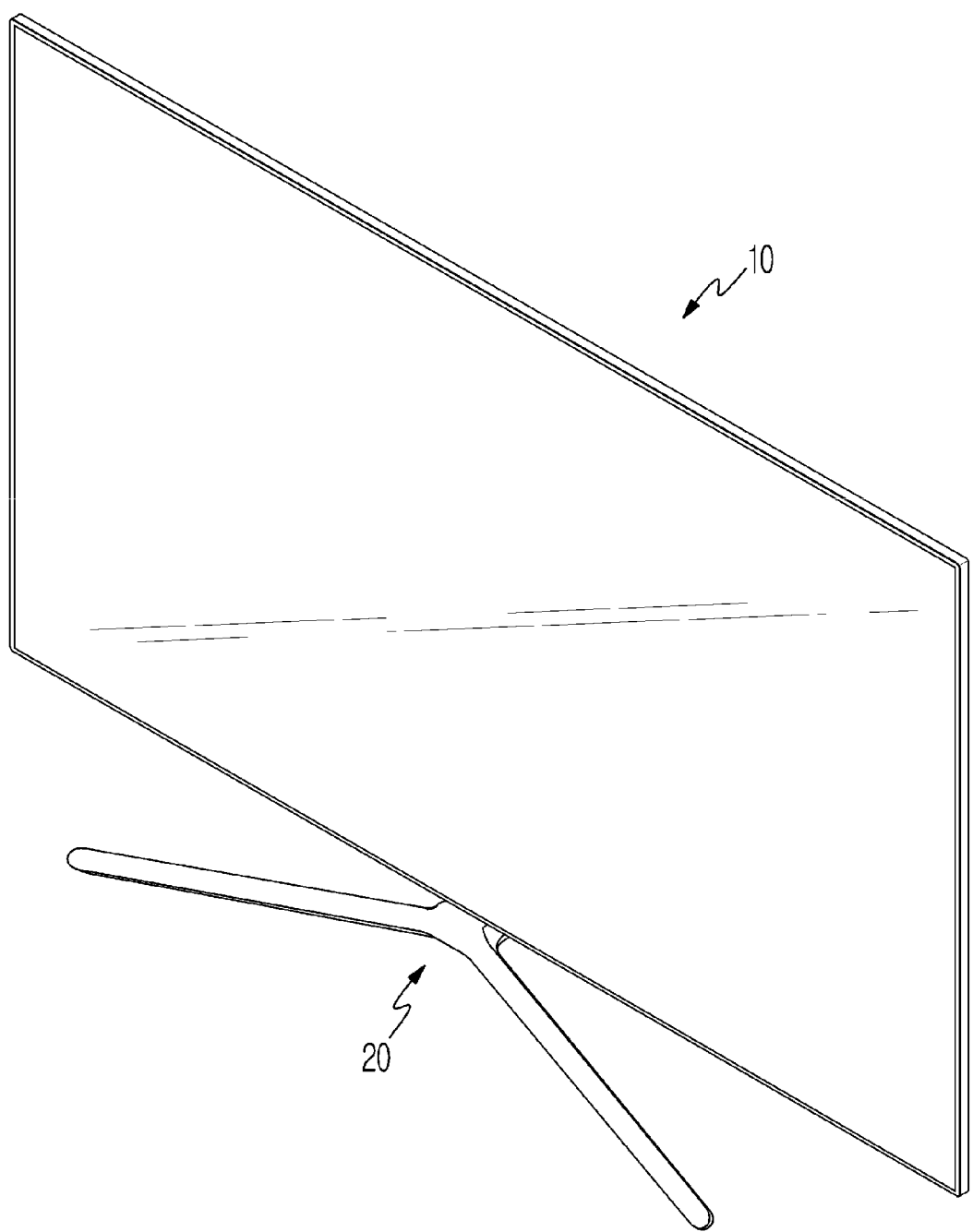
FIG. 1 is a perspective view illustrating a display apparatus according to an embodiment of the disclosure.

The embodiments set forth herein and illustrated in the configuration of the present disclosure are only the most preferred embodiments and are not representative of the full the technical spirit of the present disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~and/or~," or the like.

Hereinafter, embodiments according to the disclosure will be described in detail with reference to the accompanying drawings.

Figure 2:
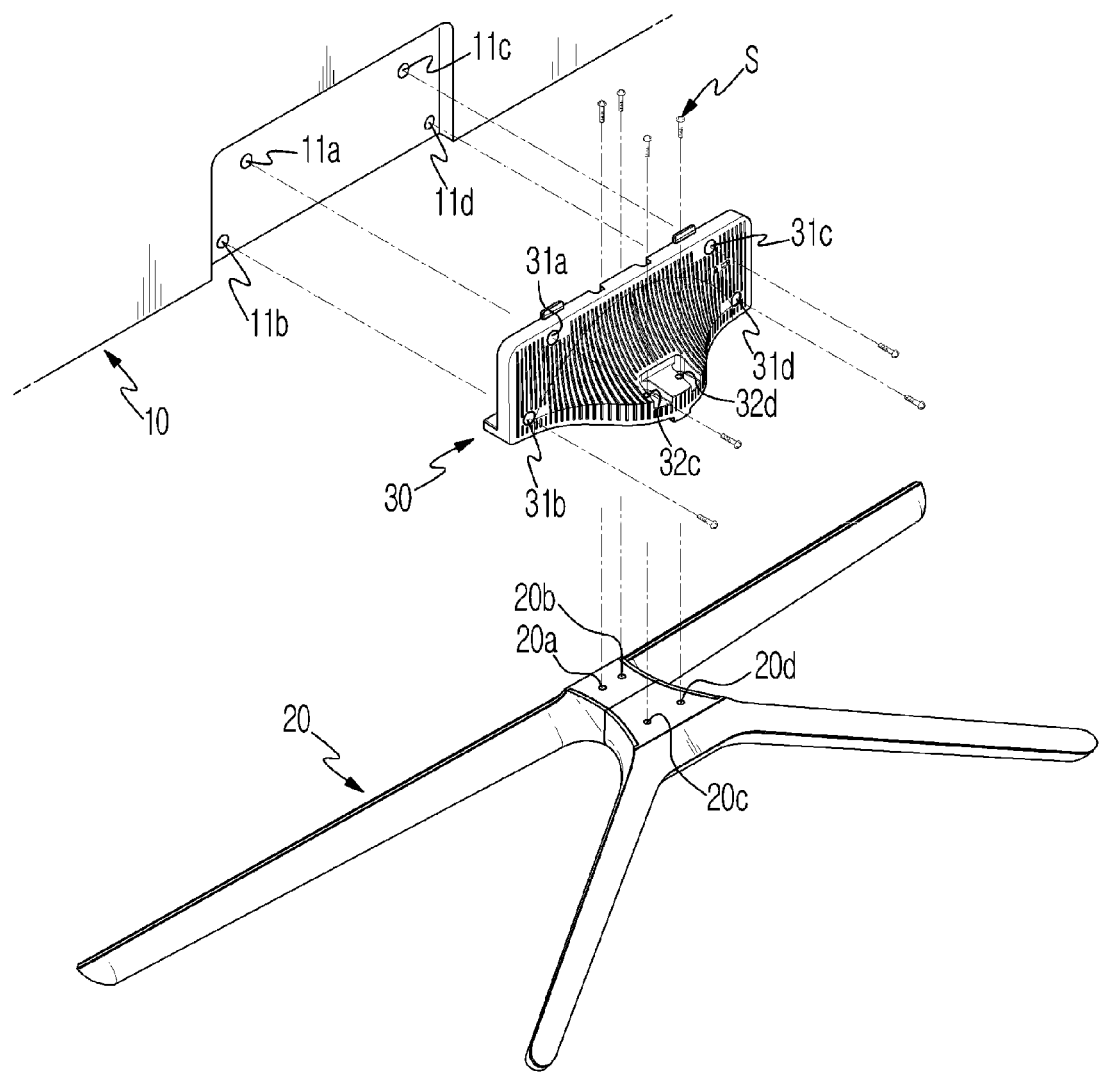
FIG. 2 is a view illustrating a display apparatus according to an embodiment of the disclosure, which shows a display unit, a coupling plate, and a stand separated from each other.
Figure 3:
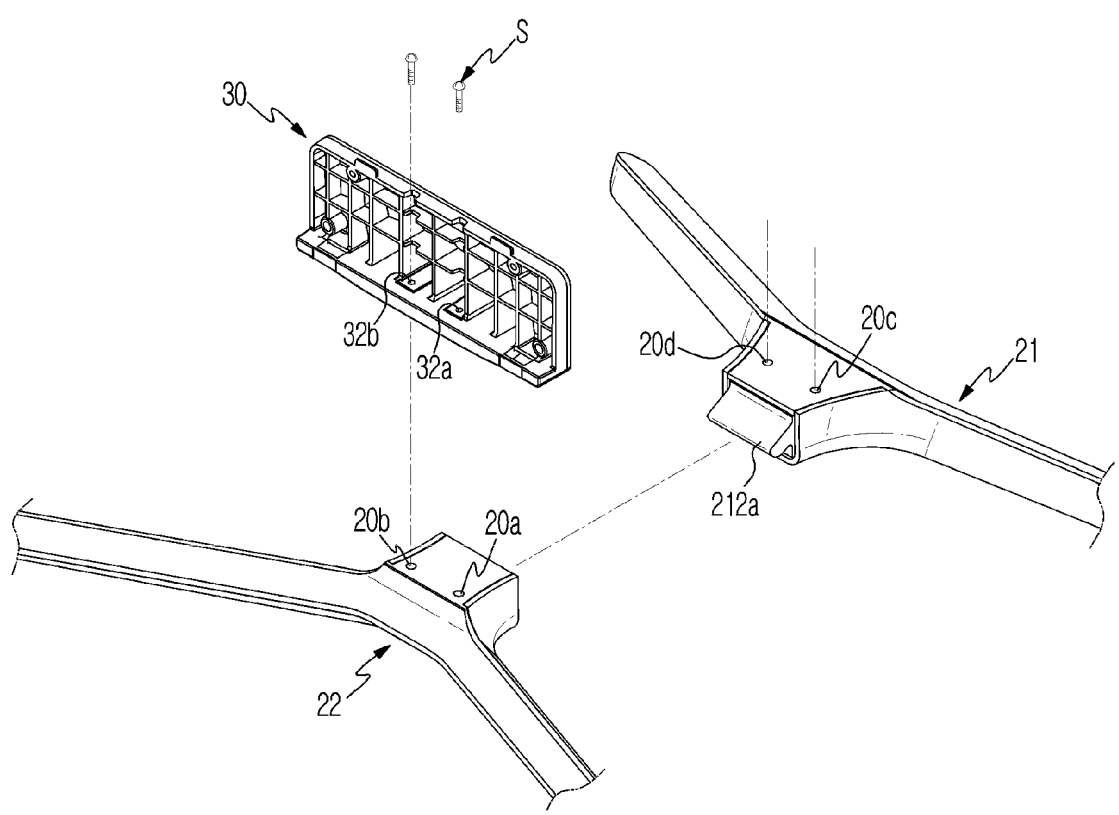
FIG. 3 is a view illustrating a display apparatus according to an embodiment of the disclosure, which shows a coupling plate, a first stand member, and a second stand member separated from each other.

FIG. 1 is a perspective view illustrating a display apparatus according to an embodiment of the disclosure, FIG. 2 is a view illustrating a display apparatus according to an embodiment of the disclosure, which shows a display unit, a coupling plate, and a stand separated from each other, and FIG. 3 is a view illustrating a display apparatus according to an embodiment of the disclosure, which shows a coupling plate, a first stand member, and a second stand member separated from each other.

Referring to FIGS. 1 to 3, a display apparatus 1 according to an embodiment of the disclosure may include a display unit 10 displaying a screen, a state 20 allowing the display unit 10 to be used in an upright position on a horizontal plane, and a coupling plate 30 coupling the display unit 10 to the stand 20 such that the display unit 10 is connected to the stand 20.

The stand 20 may be supported on a horizontal plane and may be coupled to the coupling plate 30. The stand 20 may include first coupling holes 20a, 20b, 20c, and 20d provided on the upper surface thereof, and the coupling plate 30 may include second coupling holes 31a, 31b, 31c, and 31d corresponding to the first coupling holes 20a, 20b, 20c, and 20d. In addition, the coupling plate 30 may include third coupling holes 32a, 32b, 32c, and 32d for coupling with the display unit 10, and the display unit 10 may include fourth coupling holes 11a, 11b, 11c, and 11d corresponding to the third coupling holes 32a, 32b, 32c, and 32d.

As described above, the first coupling holes 20a, 20b, 20c, and 20d may correspond to the second coupling holes 31a, 31b, 31c, and 31d, and the third coupling holes 32a, 32b, 32c, and 32d may correspond to the fourth coupling holes 11a, 11b, 11c, and 11d. Through a plurality of fastening members S provided corresponding in number to the number of the coupling holes, the stand 20 may be coupled to the coupling plate 30, and also the coupling plate 30 may be coupled to the display unit 10.

As shown in FIG. 3, the stand 20 includes a first stand member 21 including a coupling protrusion 212a and a second stand member 22 including a coupling groove 222a into which the coupling protrusion 212a is inserted.

The first stand member 21 and the second stand member 22 may include the first coupling holes 20a, 20b, 20c, and 20d on the upper surfaces thereof. The first stand member 21 and the second stand member 22 may be coupled to each other by inserting the coupling protrusion 212a into the coupling groove 222a without using a separate fastening member. The first stand member 21 and the second stand member 22 may be coupled to each other to form the stand 20.

As the stand 20 is formed by the first stand member 21 and the second stand member 22 coupled to each other in the front-rear direction, the width of the front-rear direction of a packaging box packaging the display apparatus may be significantly reduced. Therefore, the display apparatus may be efficiently transported and stored.

The stand 20 may be formed by inserting the first stand member 21 into the second stand member 22 in a diagonal direction. That is, the coupling direction between the first stand member 21 and the second stand member 22 may be a diagonal direction. To this end, the coupling protrusion 212a may be obliquely formed in a downward direction, and the coupling groove 222a may also be obliquely formed in a downward direction to have a shape corresponding to that of the coupling protrusion 212a.

Since the coupling direction between the first stand member 21 and the second stand member 22 is a diagonal direction, the stand 20 may stand by itself without a separate fastening member, and is not separated even with a load applied in the direction of gravity. That is because, in order to separate the stand 20 into the first stand member 21 and the second stand member 22, the stand 20 needs to receive a force in a direction opposite to the coupling direction, and in which case a force in a direction opposite to the direction of gravity is required. That is, when a force is applied in the direction of gravity, the stand 20 only receives a force in a direction of coupling the first stand member 21 to the second stand member 22 rather than receiving a force in a direction of separating the first stand member 21 from the second stand member 22. Accordingly, stable coupling of the first stand member 21 and the second stand member 22 is enabled.

Figure 4:
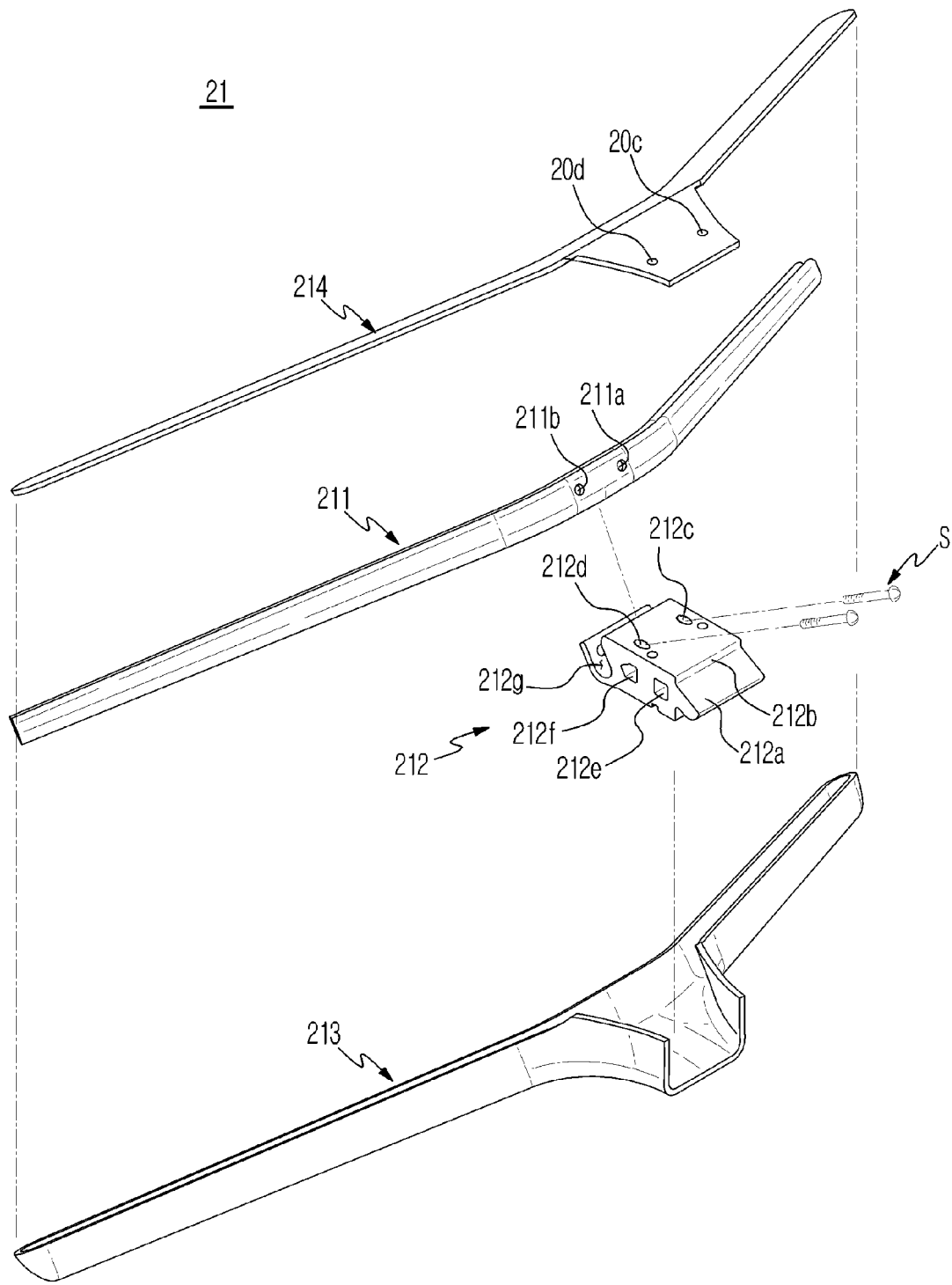
FIG. 4 is an exploded view illustrating disassembled parts of a first stand member of a display apparatus according to an embodiment of the disclosure.
Figure 5:
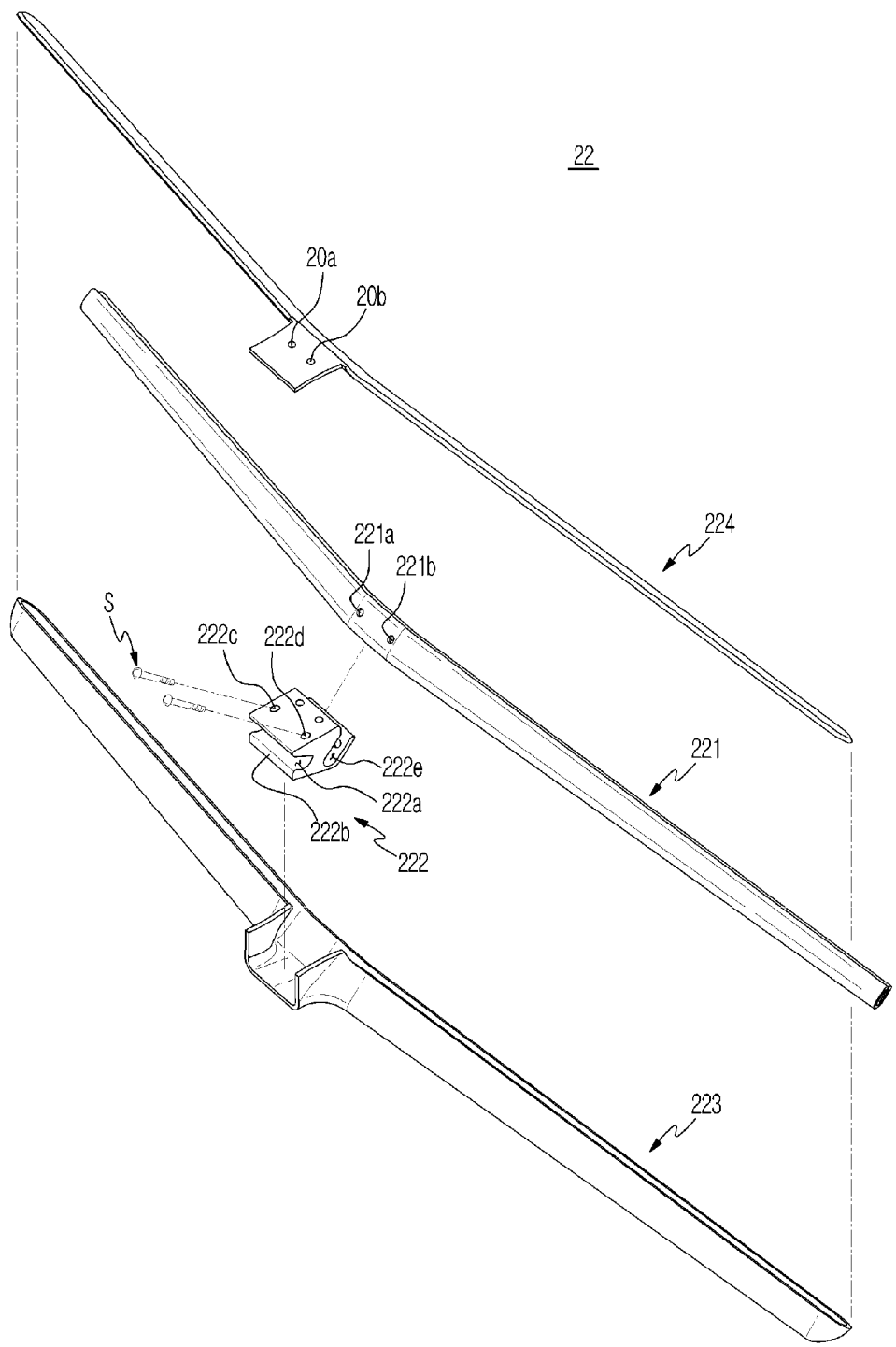
FIG. 5 is an exploded view illustrating disassembled parts of a second stand member of a display apparatus according to an embodiment of the disclosure.

FIG. 4 is an exploded view illustrating disassembled parts of a first stand member of a display apparatus according to an embodiment of the disclosure, and FIG. 5 is an exploded view illustrating disassembled parts of a second stand member of a display apparatus according to an embodiment of the disclosure.

Hereinafter, a specific configuration of the first stand member and the second stand member will be described in detail with reference to the drawings.

The first stand member 21 includes a first leg portion 211, a first coupling portion 212 coupled to the first leg portion 211 and including the coupling protrusion 212a, and first upper and lower housings 214 and 213 accommodating the first leg portion 212 and the first coupling portion 212 therein.

The first leg portion 211 is supported on a horizontal plane, obliquely extends toward front opposite sides or rear opposite sides, and forms an approximately V-shape. The first leg portion 211 may include fastening holes 211a and 211b for coupling with the first coupling portion 212.

The first coupling portion 211 may include a first coupling surface 212b facing the second stand member 22, and may include the coupling protrusion 212a obliquely protruding downward from the first coupling surface 212b.

The first coupling portion 212 may include a first leg groove 212g. Fastening holes 212c and 212d corresponding to the fastening holes 211a and 211b of the first leg portion 212 may be provided on the upper surface of the first coupling portion 212. After the first leg portion 211 is inserted into the first leg groove 212g of the first coupling portion 212, the fastening holes 211a and 211b of the first leg portion 211 and the fastening holes 212c and 212d of the first coupling portion 211 are arranged to correspond to each other, and then the first coupling portion 212 is coupled to the first leg portion 211 through a fastening member S.

The first leg portion 211 coupled to the first coupling portion 212 may be accommodated at an inside of the first upper housing 214 and the first lower housing 213.

The first leg portion 211 and the first coupling portion 212 may be formed of a metal material. Accordingly, the first leg portion 211 and the first coupling portion 212 may have superior strength compared to an injection molded product of plastic and may reduce the volume.

The first coupling portion 212 may be formed by extruding a metal. The first coupling portion 212 may be provided by extruding a metal to be lengthways extend to the lateral sides, and then cutting the metal. After cutting, a coring portion or a fastening hole may be additionally formed according to the designer's intention. Since the first coupling portion 21 is fabricated through cutting after extrusion, productivity may be significantly improved compared to when individually fabricating the first coupling portions. In addition, production costs may be reduced.

In addition, since the first coupling portion 212 is formed by extruding a metal, high dimensional stability may be ensured by the characteristics of extrusion, and thus the clearance in the coupling with the second coupling portion 222 may be reduced. That is, the assembly performance may increase. However, the disclosure is not limited thereto, and the first coupling portion may be provided through injection molding or the like. In this case, the first coupling portion may have relatively low density and strength, so that the volume of the first coupling portion may be increase.

The first housings 213 and 214 may be formed of a non-metallic material, such as plastic. Accordingly, a sense of unity in appearance with the display unit 10 is ensured, and the horizontal plane supporting the stand 20 is prevented from being damaged by the leg portions 211 and 221 formed of metal.

The second stand member 22 includes a second leg portion 222 and a second coupling portion 222 including the coupling groove 222a provided to be coupled to the second leg portion 221, and a second upper housing 224 and a second lower housing 223 accommodating the second leg portion 221 and the second coupling portion 222 therein.

The second leg portion 221 is supported on a horizontal plane, extends obliquely toward rear opposite sides or front opposite sides, and forms an approximately V-shape. The second leg portion 221 may include fastening holes 221a and 221b for coupling with the second coupling portion 222.

The second coupling portion 222 may include a second coupling surface 222b facing the first stand member 21, and may include the coupling groove 222a that is recessed obliquely downward from the second coupling surface 222b.

The second coupling portion 222 may include a second leg groove 222e. Fastening holes 222c and 222d corresponding to the fastening holes 221a and 221b of the second leg portion 221 may be provided on the upper surface of the second coupling portion 222. After the second leg portion 221 is inserted into the second leg groove 222e of the second coupling portion 222, the fastening holes 221a and 221b of the second leg portion 221 and the fastening holes 222c and 222d of the second coupling portion 222 are adjusted to correspond to each other, and then the second coupling portion 222 is coupled to the second leg portion 221 through a fastening member S.

The second leg portion 221 and the second coupling portion 222 coupled to each other may be accommodated at an inside of the second upper housing 224 and the second lower housing 223.

The second leg portion 221 and the second coupling portion 222 may be formed of a metal material. Accordingly, the second leg portion 221 and the second coupling portion 222 may have superior strength compared to an injection molded product of plastic, and may reduce the volume.

The second coupling portion 222 may be formed by extruding metal. The second coupling portion 222 may be provided by extruding a metal to be lengthways extended to the lateral sides, and then cutting the metal. After cutting, a fastening hole may be additionally provided according to the designer's intention. Since the second coupling portion 222 is fabricated through cutting after extrusion, productivity may be significantly improved compared to when individually manufacturing the second coupling portions. In addition, production costs may be reduced.

In addition, since the second coupling portion 222 is formed by extruding a metal, high dimensional stability may be ensured by the characteristics of extrusion, and thus the clearance in the coupling with the first coupling portion 212 may be reduced. That is, the assembly performance may increase. However, the disclosure is not limited thereto, and the second coupling portion may be provided through injection molding or the like. In this case, the second coupling portion may have relatively low density and strength, so that the volume of the second coupling portion may be increased.

The second housings 223 and 224 may be formed of a non-metallic material such as plastic. Accordingly, a sense of unity in appearance with the display unit 10 is ensured, and the horizontal plane supporting the stand 20 is prevented from being damaged by the leg portions 211 and 221 formed of metal.

Figure 6:
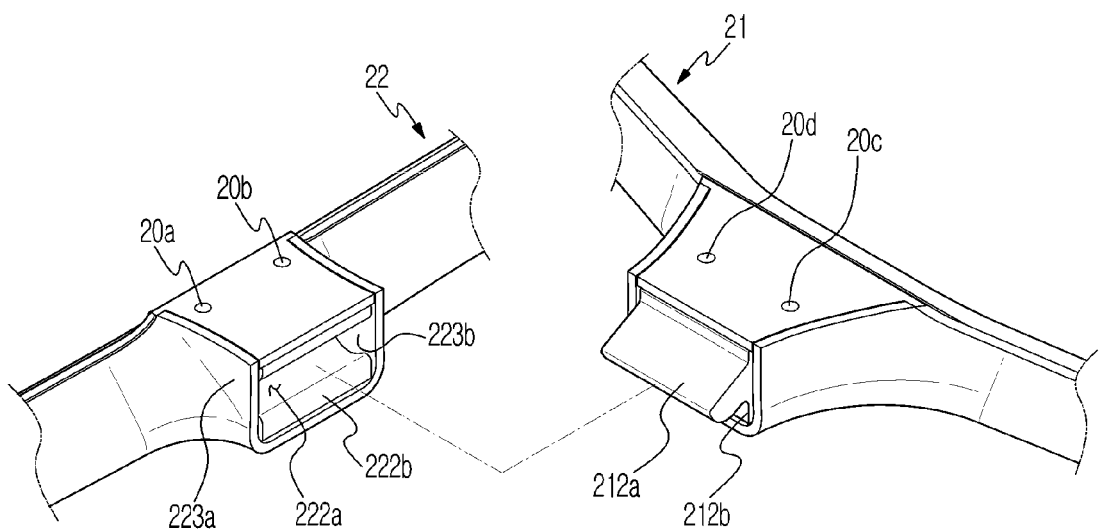
FIG. 6 is a view illustrating a coupling portion of a first stand member and a second stand member in a display apparatus according to an embodiment of the disclosure.
Figure 7:
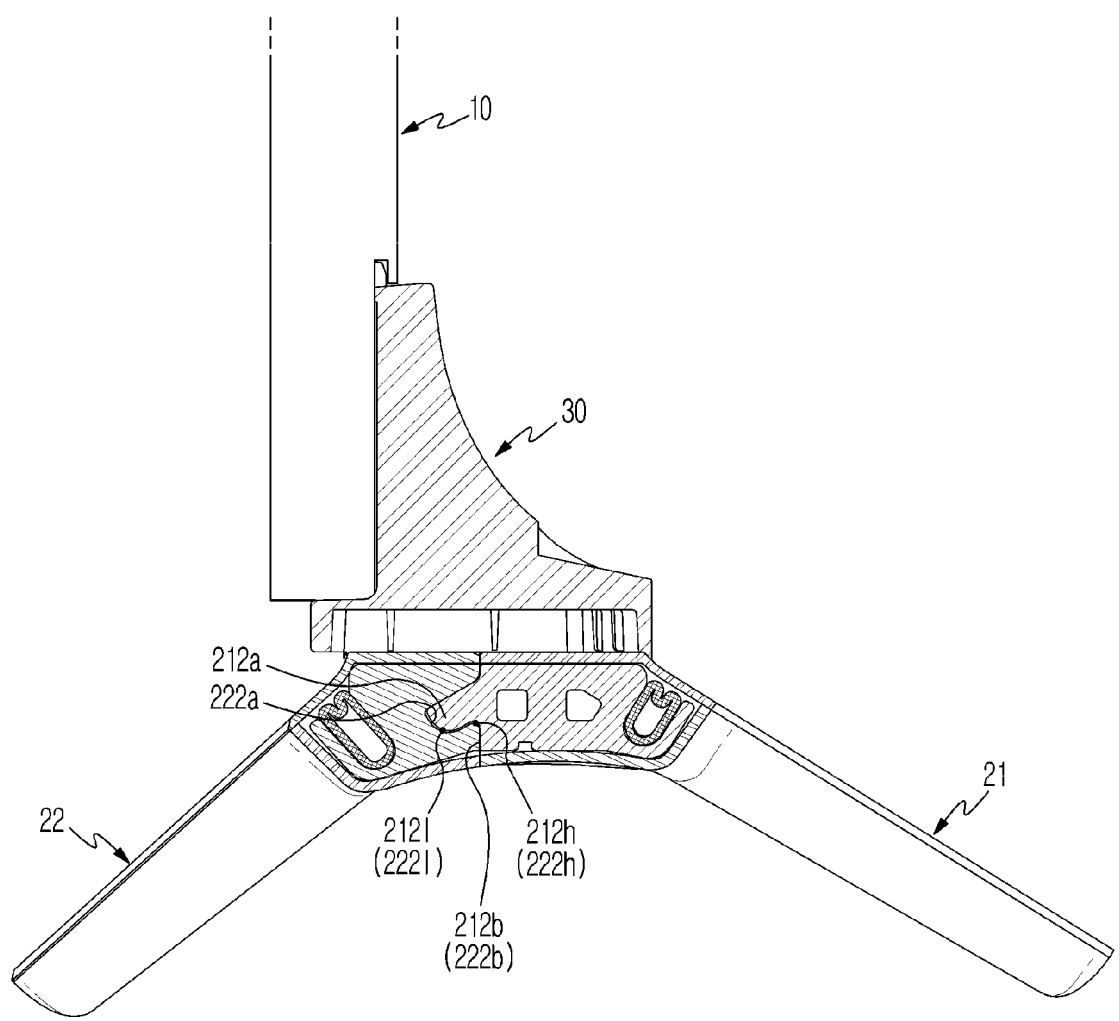
FIG. 7 is a side cross-sectional view illustrating a display apparatus according to an embodiment of the disclosure.

FIG. 6 is a view illustrating a coupling portion of a first stand member and a second stand member in a display apparatus according to an embodiment of the disclosure, and FIG. 7 is a side cross-sectional view illustrating a display apparatus according to an embodiment of the disclosure.

As illustrated in FIG. 6, the second lower housing 223 may be provided to cover both sides of the second coupling portion 222. That is, the second lower housing 223 may include sidewalls 223a and 223b covering both sides of the second coupling portion 222.

The both sidewalls 223a and 223b may prevent the first stand member 21 from moving to lateral sides relative to the second stand member 22 when the coupling protrusion 212a is inserted into the coupling groove 222a.

The coupling groove 222a of the second coupling portion 222 has both sides thereof open, so that even when coupled with the first coupling portion 212, movement to the left and right may not be prevented. However, when the second coupling portion 222 is coupled to the second lower housing 223, the both sidewalls 223a and 223b of the second lower housing 223 may cover the open both sides of the coupling groove 222a. Accordingly, in a state in which the coupling protrusion 212a is inserted into the coupling groove 222a, the coupling protrusion 212a is prevented from moving from side to side. Meanwhile, when the direction in which the coupling protrusion 212a is inserted into the coupling groove 222a is referred to as a first direction, a second direction crossing the first direction may indicate the left and right directions.

As described above, the first stand member 21 may be coupled to the second stand member 22 by inserting the coupling protrusion 212a into the coupling groove 222a in a diagonal direction. Conversely, the first stand member 21 coupled to the second stand member 22 may be withdrawn in a diagonal direction so that the first stand member 21 is separated from the second stand member 22. That is, the first stand member 21 and the second stand member 22 may be freely coupled to and separated from each other without using a separate fastening member.

However, when the first stand member 21 and the second stand member 22 are separable from each other even after being coupled to the display unit 10, the first stand member 21 and the second stand member 22 may be separated from each other in a special situation, such as during transportation of the display apparatus. Therefore, there is a need to prevent separation of the first stand member 21 and the second stand member 22.

When the coupling plate 30 is coupled to the first stand member 21 and the second stand member 22, the first stand member 21 and the second stand member 22 may be prevented from being separated from each other. The third coupling holes 32a and 32b of the coupling plate 30 are coupled to the first coupling holes 20a and 20b of the second stand member 22, and the third coupling holes 32c and 32d of the coupling plate 30 are coupled to the first coupling holes 20c and 20d of the first stand member 21 to prevent the first stand member 21 from being separated from the second stand member 22.

As shown in FIG. 7, when the first stand member 21 is coupled to the second stand member 22, the first coupling surface 212b and the second coupling surface 222b are provided to make surface contact with each other. When the first coupling surface 212b and the second coupling surface 222b make surface contact with each other, the contact area is increased and stress is distributed. Accordingly, the coupling stability and durability of the first stand member 21 and the second stand member 22 may be increased.

A lowest point 212l of the coupling protrusion 212a may be disposed below a contact point 212h of the coupling protrusion 212a and the first coupling surface 212b. Similarly, a lowest point 222l of the coupling groove 222a may be disposed below a contact point 222h of the coupling groove 222a and the second coupling surface 222b. Accordingly, a surface between the lowest point 212l of the coupling protrusion 212a and the contact point 212h of the coupling protrusion 212a and the first coupling surface 212b may be formed obliquely downward, and a surface between the lowest point 222l of the coupling groove 222a and the contact point 222h of the coupling groove 222a and the second coupling surface 222b may be formed obliquely downward. When a load of the display unit 10 is transmitted to the stand 20, the first coupling surface 212b below the coupling protrusion 212a and the second coupling surface 222b below the coupling groove 222a are subjected to a force in a direction away from each other. When the first coupling surface 212b and the second coupling surface 222b move away from each other by the force, the first stand member 21 and the second stand member 22 may be separated from each other. In this case, the display unit 10 may not be supported by the stand 20 and collide with the horizontal plane, causing the display unit 10 from being damaged. According to the disclosure, the surface between the lowest point 212l of the coupling protrusion 212a and the contact point 212h of the coupling protrusion 212a and the first coupling surface 212b and the surface between the lowest point 222l of the coupling groove 222a and the contact point 222h of the contact groove 222a and the second coupling surface 222b are obliquely formed downward, and such an oblique configuration may prevent the first coupling surface 212b and the second coupling surface 222b from moving away from each other. That is, the first stand member 21 and the second stand member 22 may be stably coupled to each other.

On the other hand, although not shown in the drawing, the coupling groove may be provided in the first stand member, and the coupling protrusion may be provided in the second stand member.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

INDUSTRIAL APPLICABILITY

[Sequence Listing Free Text]

The invention claimed is:

1. A display apparatus comprising:
a display unit; and
a stand connected to the display unit and supporting the display unit,
wherein the stand comprises:
　a first stand member including a first coupling surface and a coupling protrusion; and
　a second stand member including a second coupling surface and a coupling groove having a shape corresponding to a shape of the coupling protrusion such that the coupling protrusion is inserted into the coupling groove, and coupled to the first stand member to form the stand,
wherein
when the first stand member and the second stand member are coupled to each other, the first coupling surface faces the second coupling surface, and
the coupling protrusion protrudes along a first direction inclined downward from the first coupling surface,
the coupling groove entirely extends along the first direction from the second coupling surface, and
the first stand member and the second stand member are coupled to each other along the first direction.

2. The display apparatus of claim 1, wherein
a lowest point of the coupling protrusion is located below a contact point between the coupling protrusion and the first coupling surface.

3. The display apparatus of claim 2, wherein
the coupling groove is recessed on the second coupling surface, and
a lowest point of the coupling groove is located below a contact point between the coupling groove and the second coupling surface.

4. The display apparatus of claim 3, wherein when the first stand member is coupled to the second stand member, the first coupling surface makes surface contact with the second coupling surface.

5. The display apparatus of claim 1, further comprising a coupling plate that couples the display unit to the stand such that the display unit is connected to the stand.

6. The display apparatus of claim 5, wherein the coupling plate is coupled to the first stand member and the second stand member to prevent the first stand member from being separated from the second stand member.

7. The display apparatus of claim 1, wherein the first stand member includes:
　a first leg portion supported on a horizontal plane;
　a first coupling portion coupled to the first leg portion and including the coupling protrusion; and
　a first housing accommodating the first leg portion and the first coupling portion.

8. The display apparatus of claim 7, wherein the second stand member includes:
　a second leg portion supported on the horizontal plane;
　a second coupling portion coupled to the second leg portion and including the coupling groove; and
　a second housing accommodating the second leg portion and the second coupling portion.

9. The display apparatus of claim 8, wherein the first coupling portion and the second coupling portion are formed by extruding metal.

10. The display apparatus of claim 8, wherein when the coupling protrusion is inserted into the coupling groove in the first direction, the second housing prevents the coupling protrusion from moving in a second direction perpendicular to the first direction.

11. A display apparatus comprising:
a display unit;
a stand connected to the display unit and supporting the display unit; and
a coupling plate that couples the display unit to the stand such that the display unit is connected to the stand,
wherein the stand comprises:
　a first stand member including a first coupling surface and a coupling protrusion protruding along a first direction inclined downward from the first coupling surface; and
　a second stand member including a second coupling surface facing the first coupling surface when the first stand member and the second stand member are coupled to each other, and a coupling groove having a shape corresponding to a shape of the coupling protrusion and entirely extending along the first direction from the second coupling surface such that the coupling protrusion is inserted into the coupling groove,
wherein the first stand member and the second stand member are coupled to each other along the first direction.

12. The display apparatus of claim 11, wherein the coupling plate is coupled to the first stand member and the second stand member to prevent the first stand member from being separated from the second stand member.

13. The display apparatus of claim 11, wherein
a lowest point of the coupling protrusion is located below a contact point between the coupling protrusion and the first coupling surface.

14. The display apparatus of claim 13, wherein
the coupling groove is recessed on the second coupling surface, and
a lowest point of the coupling groove is located below a contact point between the coupling groove and the second coupling surface.

15. The display apparatus of claim 14, wherein when the first stand member is coupled to the second stand member, the first coupling surface makes surface contact with the second coupling surface.

* * * * *